United States Patent
Swars et al.

[11] Patent Number: 5,948,504
[45] Date of Patent: Sep. 7, 1999

[54] ELECTRICALLY INSULATING SUPPORTING STRUCTURE CAPABLE OF METALLIC BONDING, PROCESS FOR PRODUCING THE SAME, ELECTRICALLY HEATABLE CATALYTIC CONVERTER AND ELECTRICALLY CONDUCTIVE HONEYCOMB BODY USING THE SAME

[75] Inventors: Helmut Swars, Bergisch Gladbach; Manfred Vierkötter, Neu Seelschield, both of Germany

[73] Assignee: Emitec Gesellschaft fuer Emissionstechnologie mbH, Lohmar, Germany

[21] Appl. No.: 08/484,665

[22] Filed: Jun. 7, 1995

Related U.S. Application Data

[63] Continuation of application No. PCT/EP94/00048, Jan. 10, 1994.

[30] Foreign Application Priority Data

Jan. 21, 1993 [DE] Germany .............................. 43 01 564

[51] Int. Cl.$^6$ ....................................................... F01N 3/26
[52] U.S. Cl. ............................... 428/116; 60/30; 422/174; 422/177
[58] Field of Search ............................... 428/116; 60/300; 422/174, 177

[56] References Cited

U.S. PATENT DOCUMENTS 2,255,500   9/1941   Blaha ...................................... 219/464

FOREIGN PATENT DOCUMENTS

| 276941 | 3/1990 | Germany . |
|---|---|---|
| WO 90/12951 | 11/1990 | WIPO . |
| WO 91/14855 | 10/1991 | WIPO . |
| WO 92/02714 | 2/1992 | WIPO . |
| WO93/12880 | 7/1993 | WIPO . |

*Primary Examiner*—Timothy M. Speer
*Attorney, Agent, or Firm*—Herbert L. Lerner; Laurence A. Greenberg

[57] ABSTRACT

An electrically insulating supporting structure, such as of an electrically heatable catalytic converter or honeycomb body being mechanically loadable in all directions for metallic bonding to electrically conductive components being electrically separated from one another, includes a first metallic structure, a second metallic structure and an electrically insulating, ceramic material disposed between the structures and three-dimensionally pressed-in from substantially all sides. The structures are shaped to exert pressure from substantially all sides onto the ceramic material, without touching one another.

16 Claims, 3 Drawing Sheets

ELECTRICALLY INSULATING SUPPORTING STRUCTURE CAPABLE OF METALLIC BONDING, PROCESS FOR PRODUCING THE SAME, ELECTRICALLY HEATABLE CATALYTIC CONVERTER AND ELECTRICALLY CONDUCTIVE HONEYCOMB BODY USING THE SAME

CROSS-REFERENCE TO RELATED APPLICATION

This application is a Continuation of International application Ser. No. PCT/EP94/00048, filed Jan. 10, 1994.

BACKGROUND OF THE INVENTION

FIELD OF THE INVENTION

The invention relates to an electrically insulating supporting structure being mechanically loadable in all directions and being capable of metallic bonding to electrically conductive components being electrically separated from one another.

Often such components must nevertheless be held together mechanically, and therefore a large number of electrically insulating supporting structures are known. In general, plastics or ceramic components are used for purposes of electrical insulation However, problems always occur whenever the electric insulations are at the same time exposed to considerable mechanical strains For instance, ceramic structures can withstand loads but not major tensile forces. Moreover, if tensile forces are to be withstood, ceramic structures must be secured to the electrically conductive components, which again presents problems Although metallized ceramics are known that can be brazed on, for instance, nevertheless once again the tensile strain that can be withstood is only that which the ceramic itself allows.

International Patent Application WO 92/02714, corresponding to U.S. Pat. No. 5,411,711 discloses an electrically heatable honeycomb body with internal support structures, in which individual components or partial regions or areas must be electrically insulated from one another. At the same time, extreme temperature strains and extreme mechanical loads because of thermal expansion also occur.

SUMMARY OF THE INVENTION

It is accordingly an object of the invention to provide an electrically insulating supporting structure being capable of metallic bonding to electrically separate electrically conductive components, a process for producing the same, an electrically heatable catalytic converter and an electrically conductive honeycomb body using the same, which overcome the hereinafore-mentioned disadvantages of the heretofore-known devices and methods of this general type, in which the supporting structure is capable of bearing high mechanical loads in all directions, and in particular tensile loads and wherein the supporting structure is particularly suitable for use in an electrically heatable honeycomb body, for which extreme loads are typical With the foregoing and other objects in view there is provided, in accordance with the invention, an electrically insulating supporting structure being mechanically loadable in all directions for metallic bonding to electrically conductive components being electrically separated from one another, comprising a first metallic structure; a second metallic structure; and an electrically insulating, ceramic material being disposed between the first and second metallic structures and being three-dimensionally pressed-in from substantially all sides; the first and second metallic structures being shaped to exert pressure from substantially all sides onto the ceramic material, without touching one another.

A decisive factor for the present invention is that two metallic structures are disposed in such a way that while they do not touch each other, nevertheless they practically completely surround a ceramic layer located between them and do not allow it to escape in any direction. It is unimportant whether the ceramic layer is a powdered material or is a molded part. The structures must be shaped in such a way that neither a powder nor fragments of a molded part crumbling in response to mechanical loads can fall out. The outstanding insulating properties of ceramic powder are well known, for instance in the field of thermocouples and jacket measuring conductors. The ceramic and metal materials which are suitable for such purposes are also suitable for the present invention. It is important that the supporting structure have a capability of metallic bonding to components that are electrically separated from one another. The first metallic structure must be connectable to a first component, and the second metallic structure to a second component being electrically insulated from the first.

In accordance with another feature of the invention, a simple and especially highly suitable construction provides that the first metallic structure is a continuous wire or a continuous band, and the second structure includes individual portions that encompass the wire or the band, wherein ceramic material is pressed-in between the two metallic structures. In this way, one component can be joined metallically to the wire or band, while another component, being electrically insulated from it, can be connected to the outer portions. Regardless of the direction in which forces are exerted on the two components, the ceramic material between the two metallic structures is only under compressible strain, because it is enclosed on practically all sides. The load-bearing capacity of the supporting structure is therefore determined by that of its metallic parts, not by that of the ceramic material.

In accordance with a further feature of the invention, the ceramic material includes individual ceramic beads or small tubes, or may be in powder form. Nor does it play any role if initially compact ceramic beads or small ceramic tubes should breakdown over time, under alternating thermal strains, into fragments or powder, since the fragments cannot be lost.

In accordance with an added feature of the invention, it is especially advantageous and suitable for larger-surface-area supporting structures if the first metallic structure is form-lockingly connected to the second metallic structure by one or two bulges having at least one bottleneck, for instance in the manner of pushbuttons, wherein ceramic material, especially a thin metal oxide film, is present between the structures. In the region of the bulging features and the bottleneck, the ceramic intermediate layer cannot escape, and just as in the examples described above, regardless of the direction of the forces acting on the structure, it is always subject to pressure only. A form-locking connection is one which connects two elements together due to the shape of the elements themselves, as opposed to a force-locking connection, which locks the elements together by force external to the elements.

In accordance with an additional feature of the invention, it is especially advantageous to initially join the first and second metallic structures form-lockingly to one another, and only after that to form an insulating layer between them This can be performed by oxidation or chemical treatment of the surface, or by a special coating of one of the surfaces between the two structures.

With the objects of the invention in view, there is also provided a method for producing an electrically insulating supporting structure being mechanically loadable in all directions for metallic bonding to electrically conductive components being electrically separated from one another, which comprises pressing-in an electrically insulating ceramic material, preferably in powdered form, on substantially all sides between a first metallic structure and a second metallic structure; and shaping the first and second metallic structures to be both accessible, at least in partial regions, and to exert pressure from substantially all sides onto the ceramic material, without touching one another, for metallic bonding to further structures.

Once again it is important that both the first and the second metallic structures be accessible for metallic bonding to further structures, yet nevertheless not touch one another and between them press-in a ceramic material which is always subject to pressure, regardless of the direction of the forces occurring at the metallic structures.

In accordance with another mode of the invention, the first metallic structure is surrounded by a ceramic layer and a metal envelope, and the surrounding metal envelope is subdivided into a plurality of individual segments. It is important in this respect that the end of the individual segments of the outer metal structure not be simply open but rather be shaped on the inside in such a way that they press-in the ceramic material between them on practically all sides. For instance, a supporting structure according to the invention can be made from a conventional jacket conductor by constricting individual segments and then removing the constricted portions of the jacket (for instance mechanically by etching, or by melting).

With the objects of the invention in view, particularly for large-area supporting structures, there is additionally provided a method for producing an electrically insulating supporting structure being mechanically loadable in all directions for metallic bonding to electrically conductive components being electrically separated from one another, which comprises joining together a first metallic structure and a second metallic structure with three-dimensional form-locking connections by joint deformation; forming a surface or a surface layer being convertible chemically into an electric insulating layer on at least one of and between the first and second metallic structures; and subsequently converting the convertible surface or surface layer into an electrically insulating ceramic layer, in particular by oxidation, creating an insulating layer being pressed-in on substantially all sides between the three-dimensional form-locking connections.

In accordance with another mode of the invention, two steel layers or sheets are placed on one another as the first and second metallic structure, and at least one of the layers or sheets has an inner surface, in particular an aluminum-containing coating, which can be converted into an insulating layer; the two layers or sheets are first corrugated jointly in a first direction, and are then corrugated once again in a second direction, approximately perpendicular to the first, with major deformation of the first corrugation taking place, creating regular three-dimensional form-locking connections between the layers or sheets; and finally, the convertible inner surface is converted by a chemical treatment and/or a heat treatment into a ceramic insulating layer.

The corrugation of metal layers or sheets can be accomplished by intermeshing gear wheels. The successively accomplished corrugation in two directions being approximately at right angles to one another produces very specific fold forms, which result in highly stable three-dimensional form-locking connections when two layers or sheets are stacked on one another. An aluminum layer on the inside of one of the layers or sheets is readily deformed along with it in the two corrugation operations, and afterward as well is still located everywhere between the two layers or sheets. If that layer is then oxidized, which can be done, for instance, by a heat treatment in oxygen, then a uniform insulating film, which is pressed-in everywhere, between the two layers or sheets, is the result. If the structure has a very large surface area, then substances that can be activated later and contain oxygen can be provided as a coating between the layers or sheets, in order to furnish the oxygen required for the oxidation.

The special field of application of the invention is the stabilization of an electrically heatable catalytic converter, of the kind described in International Patent Application WO 92/02714, corresponding to U.S. Pat. No. 5,411,711. Those documents are hereby incorporated in their entirety by reference, in order to avoid repetition. In the presence of alternating thermal strains, and when an electrically heatable catalytic converter of that kind is installed in motor vehicles, considerable mechanical strains as well as vibrations occur between the individual parts. Insulation provided by air gaps is therefore not adequate for all fields of use. Instead, it is important to mechanically fix the individual components with respect to one another, so that they can neither approach one another (which would cause a short circuit) nor move away from one another (which would lead to vibration or structural breakage). The supporting structure of the invention is especially suitable for that purpose, because the first metallic structure can be secured metallically to first components, and the second metallic structure can be secured metallically to second components being electrically separated from them Both generally flat supporting structures, and one or more linear supporting structures, may be used.

As will be described in further detail in conjunction with the drawing, electrically heatable catalytic converters are often constructed as electrically conductive honeycomb bodies and are subdivided into various partial regions. The supporting structure according to the invention can be used simultaneously for purposes of electrical subdivision and mutual fixation of the various partial regions, because it is disposed in the interior of the honeycomb body. The first metallic structure of the supporting structure is metallically firmly bonded to one of the partial regions, and the second metallic structure is metallically firmly bonded to another of the partial regions. This can especially advantageously be performed by hard soldering or brazing, since such honeycomb bodies must often be brazed anyway. However, welding or sintering is also possible as a joining technique. Another option in the use of a supporting structure according to the invention in such honeycomb bodies is to place them on the end surfaces of the catalytic converter and to support various partial regions against one another, in such a way that the first metallic structure of the supporting structure is metallically firmly joined to one of the partial regions, and the second metallic structure is metallically firmly joined to another of the partial regions. In that case, the supporting structure joins various partial regions together mechanically, in the manner of a hoop or a clamp, but not electrically.

Therefore, with the objects of the invention in view, there is furthermore provided an electrically heatable catalytic converter, comprising an interior, end surfaces and first and second electrically conductive and electrically separated components; and an electrically insulating, stabilizing supporting structure being mechanically loadable in all directions for metallic bonding to the components, the supporting structure being disposed in the interior or at the end surfaces and including a first metallic structure, a second metallic structure and an electrically insulating, ceramic material being disposed between the first and second metallic structures and being three-dimensionally pressed-in from substantially all sides, the first and second metallic structures being shaped to exert pressure from substantially all sides onto the ceramic material, without touching one another, and the first metallic structure and the second metallic structure being respectively secured to the first and second components for fixing the components relative to one another.

In accordance with another feature of the invention, the components are part of an electrically conductive honeycomb body having an interior and having an electrical subdivision into various partial regions; the supporting structure is disposed between the partial regions in the interior of the honeycomb body for electrical subdivision and for mutual fixation of the various partial regions; and the first metallic structure of the supporting structure is metallically firmly joined to one of the partial regions, and the second metallic structure is metallically firmly joined to another of the partial regions, in particular by hard soldering, brazing, welding or sintering.

In accordance with a concomitant feature of the invention, the components are part of an electrically conductive honeycomb body having end surfaces and having an electrical subdivision into various partial regions; the supporting structure is disposed on the end surfaces of the honeycomb body and supports the various partial regions against one another; and the first metallic structure of the supporting structure is metallically firmly joined to one of the partial regions, and the second metallic structure is metallically firmly joined to another of the partial regions, in particular by hard soldering, brazing, welding or sintering.

Other features which are considered as characteristic for the invention are set forth in the appended claims.

Although the invention is illustrated and described herein as embodied in an electrically insulating supporting structure capable of metallic bonding, a process for producing the same, an electrically heatable catalytic converter and an electrically conductive honeycomb body using the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
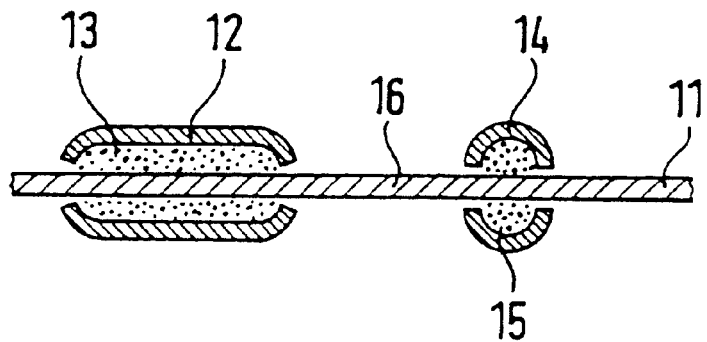
FIG. 1 is a fragmentary, diagrammatic, longitudinal-sectional view showing options for constructing supporting structures with a continuous internal metallic structure.

Referring now to the figures of the drawing in detail and first, particularly, to FIG. 1 thereof, there is seen a diagrammatic, longitudinal section of a wire-like first metallic structure 11, which is freely accessible from the outside in partial regions or areas 16. A second metallic structure 12 encompasses the first metallic structure 11 in other partial regions. Ceramic material 13, which in the present example is a powdered material such as aluminum oxide and/or magnesium oxide, is pressed-in between the two structures 11, 12. The second metallic structure 12 takes the form of short small tubes, which are spaced apart from one another and threaded onto the first metallic structure 11. Instead of small tubes, bead-like shapes 14 with enclosed ceramic beads 15 can also be used for the second metallic structure. They too are threaded onto the first metallic structure 11, leaving the partial regions 16 accessible between them. Slots that remain between the structures 11 and 12 or 11 and 14, while sufficient for electrical insulation in the presence of voltages that are not overly high, nevertheless do not allow the ceramic insulating material to escape. This material is enclosed and compressed on practically all sides by the almost-closed shape of the outer structures 12 and 14. Both the inner metallic structure 11 and the outer metallic structure 12 or 14 can be metallically joined to other components that are intended to be electrically separated. In particular, the possibility exists of making brazed connections, since the supporting structure is not temperature-sensitive and can withstand even high-temperature brazing processes unharmed.

Figure 2:
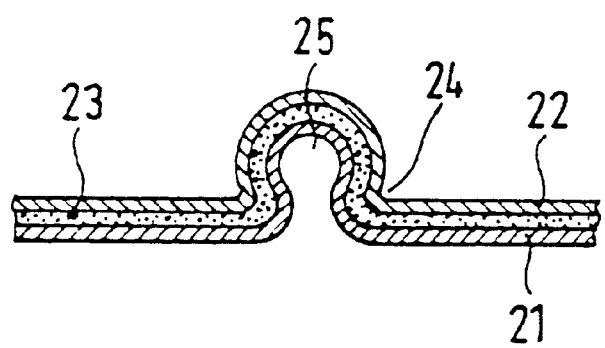
FIG. 2 is a fragmentary, sectional view through a three-dimensional form-locking connection between two metal layers or sheets.

Another exemplary embodiment of the invention is diagrammatically shown in section in FIG. 2. A first metallic structure 21 and a second metallic structure 22 with an intervening insulating layer 23 are deformed in such a way that a bulge 25 is produced, which has at least one bottleneck or narrowing 24. The term "bottleneck" is to be understood as a pushbutton style shape, for instance, which prevents the two metal structures from being pulled apart Many types of such form-locking bulges are possible. Either a single bulge already forms a three-dimensional form-locking connection as in the case of pushbuttons, or a plurality of groove-like deformations extending in different planes taken together form a three-dimensional form-locking connection. As an especially advantageous embodiment, three-dimensional form-locking connections can be achieved by jointly corrugating two stacked metal layers or sheets in two directions approximately at right angles to one another. The resultant bulges, extending in the lines of corrugation, form a large-area three-dimensional form-locking connection. Due to the typically pronounced deformation when form-locking bulges are produced, it is possible for an insulating layer 23 which was already introduced previously to be pushed away at isolated locations, and for the result to be an electrically conductive connection between the two metallic structures 21, 22. It is therefore advantageous to not make the insulating layer 23 until after the three-dimensional form-locking connections have been finished. This layer 23 can, for instance, be made by oxidizing the inner surfaces of the layers or sheets 21, 22. Quite intentionally, these layers or sheets can be provided beforehand with a coating, for instance of aluminum and/or magnesium, so as to produce certain ceramic oxide films. In large-area structures, an oxygen-containing material can additionally be introduced as a coating, in order to speed up the oxidation process later by heating. The supporting structure shown in FIG. 2 can also be bonded on both sides metallically to other components, for instance by brazing.

Figure 3:
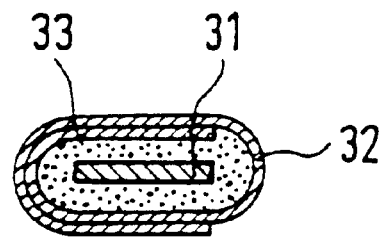
FIG. 3 is a cross-sectional view through a supporting structure with a band-like internal metallic structure.

FIG. 3 shows a cross section through another exemplary embodiment of a supporting structure having a first band-like structure 31, a ceramic insulating layer 33 and a second outer metallic structure 32 which is wound from a metal layer or sheet. Depending on stability requirements, the overlapping regions of the outer structure 32 can be brazed to one another. In the example shown in FIG. 3 as well, the second metallic structure 32 only encompasses the first band-like metallic structure 31 in some parts, so that regions which are accessible between them in the first metallic structure 31 are present for the sake of metal bonding to other parts.

Figure 4:
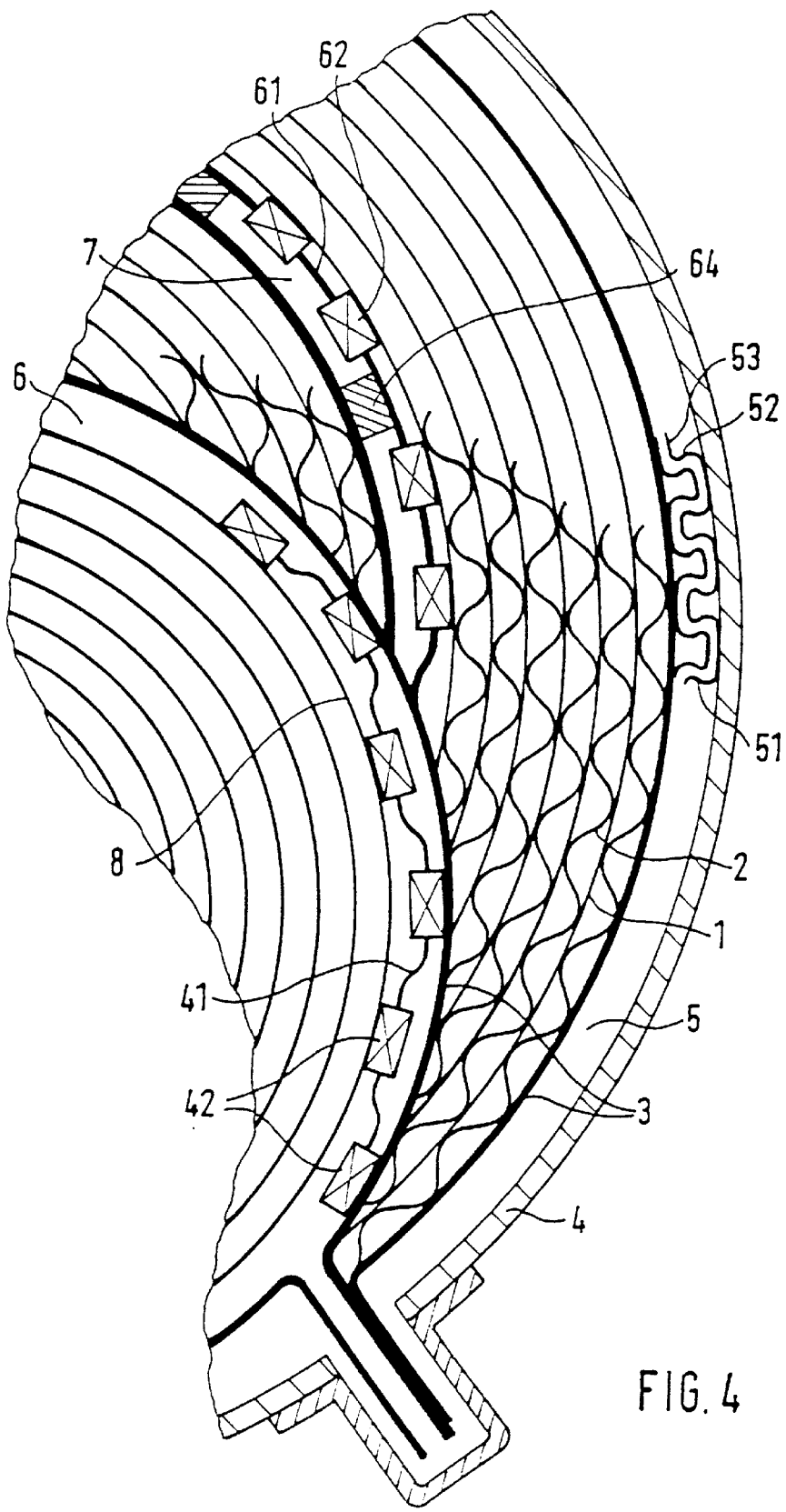
FIG. 4 is an enlarged, fragmentary, cross-sectional view through an electrically heatable catalytic converter with various examples for the use of supporting structures of the invention in its interior.

A preferred use of the supporting structures according to the invention can take place, in accordance with a further concept of the present invention, in electrically heatable metal honeycomb bodies, especially for electrically heatable catalytic converters. FIG. 4 shows a portion of a diagrammatic cross section through a honeycomb body of this kind, with various examples of options for mounting supporting structures according to the invention. With respect to the structure of electrically heatable honeycomb bodies, the entire content of International Patent Application Wo 92/02714, corresponding to U.S. Pat. No. 5,411,711, in which the structure of such honeycomb bodies is described at length, is referred to. However, the principle of mounting supporting structures which is described herein is analogously possible with honeycomb bodies that are shaped and subdivided differently, and with other filigree-like structures, which are to be electrically insulated from one another but mechanically joined. In the example shown in FIG. 4, electrically conductive structures of smooth metal layers or sheets 1 and corrugated metal layers or sheets 2, which are retained by support structures 3, are accommodated in a jacket tube 4. An insulating gap 5 exists between the support structures 3 and the jacket 4. A further insulating gap 6 is located between a support structure 3 and an adjacent sheet-metal layer 8. Still another insulating gap 7 is present at a different location between the support structures 3 and the sheet-metal layers. When such a honeycomb body is heated rapidly and necessarily not entirely uniformly, differing thermal expansions of the individual partial regions occur. The accelerations that occur during the operation of such a honeycomb body in a motor vehicle also exert considerable forces upon the structure of the honeycomb body. In order to promote a long service life, it is therefore advantageous to stabilize the gaps 5, 6, 7 mechanically by supporting structures, which must withstand loads in all dimensions and directions. At the same time, a durable electrical insulation must be assured. Various solutions to this problem are shown as examples in FIG. 4. Since such honeycomb bodies generally are subjected to a brazing or sintering process, it is especially advantageous if the bonding of the supporting structures to the adjacent components can be performed simultaneously with that process. This is the case for the examples shown.

Thus the gap 5 is stabilized by a supporting structure as in FIG. 2. A first metallic structure 51 is form-lockingly joined to a second metallic structure 52 by bulges, and an insulating layer 53 of ceramic material is compressed between them in three dimensions. The first metallic structure 51 is joined by joining techniques, such as brazing, to the support structure 3, while the second metallic structure 52 is metallically bonded by joining techniques to the jacket 4. Such a supporting structure may include individual strips or a large-area structure.

Another option for stabilization is illustrated for the gap 6, in which a supporting structure of FIG. 1 is disposed. A first, wire-like metallic structure 41 is bent in a corrugated shape, and in regions between respective crests and troughs of the corrugations, it has two second metal structures 42 in the form of small tubes or beads. The second metallic structures 42 touch the support structure 3 and the adjacent sheet-metal layer 8 in alternation. Through the use of a non-illustrated ceramic insulation between the first metallic structure 41 and the second metallic structure 42, the electrical insulating function of the gap 6 is preserved, yet a durable, slightly elastic mechanical support is accomplished. The first metallic structure 41 may also be band-like, as in the exemplary embodiment of FIG. 3.

A further embodiment of a supporting structure and its bonding to adjacent components is illustrated for the gap 7. In this case, a first wire-like or band-like metallic structure 61 is first joined at several locations to the support structure 3 of the honeycomb body. To that end, intermediate pieces 64 are inserted, or the structure 61 is joined directly to the support structure 3. Welding is considered especially appropriate as a joining technique in this case, since the joining of the structure 61 to the support structure 3 can already be performed before the honeycomb body is put together. The structure 61 carries portions of a second metallic structure 62 at intervals. The second metallic structure 62 is electrically insulated from the structure 61 by a non-illustrated insulating layer, as described. The portions of the second metallic structure 62 touch an adjacent sheet-metal layer and can be joined to it by joining techniques, in particular by a brazing or sintering process. The advantage of this configuration is that the support structure 3 of the honeycomb body can be prefabricated together with the supporting structure 61, 62, 64 prior to the actual assembly of the honeycomb body, which simplifies the assembly. The bonding to the metal layers or sheets 1, 2 can then be performed simultaneously with a later brazing process that is required in any event.

Figure 5:
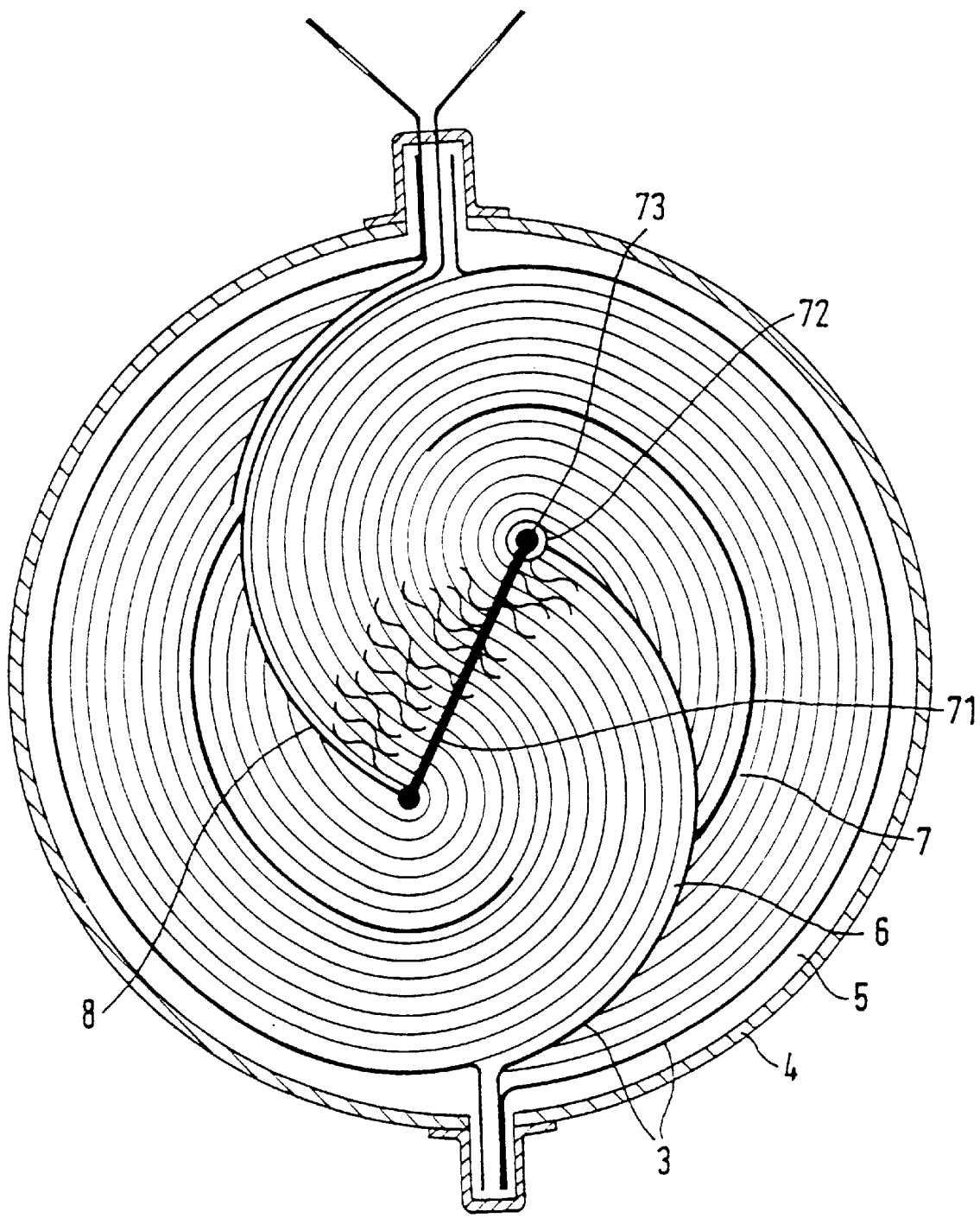
FIG. 5 is an end-elevational view of an electrically heatable catalytic converter with a supporting structure according to the invention built in on its end surface.

Instead of attaching supporting structures in the interior of an electrically heatable honeycomb body as shown in FIG. 4, the honeycomb body can also be stabilized by external attachment of supporting structures according to the invention to the end surface of the honeycomb body, as is diagrammatically shown in FIG. 5. Basic possibilities for this kind of stabilization have already been described in International Patent Application WO 92/02714, corresponding to U.S. Pat. No. 5,411,711. The structures according to the invention are especially suitable for such end-surface supports, since they can be readily metallically bonded. The exemplary embodiment shown in FIG. 1, in particular, is also suitable for incorporating end-surface supports into an electrically heatable honeycomb body. To that end, a first metallic structure 71 is inserted as a support between the desired parts of the honeycomb body and is joined to them through an insulating layer 73 and a second metallic structure 72. The number of locations to be mutually supported, and the course of their connecting supports, can be chosen freely to meet mechanical needs, since at any arbitrary location of the honeycomb body, the supporting structures of the invention can be secured metallically without causing electrical short circuits.

The present invention is suitable for mechanically supporting metal components that are insulated electrically from one another, and it is especially suitable for stabilizing electrically heatable honeycomb bodies made of electrically conductive material. The supporting structure according to the invention can be joined to adjacent components by hard soldering, brazing, sintering and/or welding.

We claim:

1. An electrically insulating supporting structure being mechanically loadable in all directions for metallic bonding to electrically conductive components being electrically separated from one another, comprising:

a first metallic structure;

a second metallic structure; and an electrically insulating, ceramic material being disposed between said first and second metallic structures and being under three-dimensional pressure by contact of said first metallic structure and said second metallic structure from substantially all sides;

said first and second metallic structures being shaped to substantially surround said ceramic material and exert pressure from substantially all sides onto said ceramic material, without touching one another.

2. The supporting structure according to claim 1, wherein said first metallic structure is a continuous wire, said second structure is formed of individual portions encompassing said wire, and said ceramic material is pressed-in between said first and second metallic structures.

3. The supporting structure according to claim 2, wherein said ceramic material is formed of individual ceramic beads surrounding said first metallic structure and being encased by said second metallic structure.

4. The supporting structure according to claim 2, wherein said ceramic material is formed of ceramic tubes surrounding said first metallic structure and being encased by said second metallic structure.

5. The supporting structure according to claim 1, wherein said first metallic structure is a continuous band, said second structure is formed of individual portions encompassing said band, and said ceramic material is pressed-in between said first and second metallic structures.

6. The supporting structure according to claim 5, wherein said ceramic material is formed of individual ceramic beads surrounding said first metallic structure and being encased by said second metallic structure.

7. The supporting structure according to claim 5, wherein said ceramic material is formed of ceramic tubes surrounding said first metallic structure and being encased by said second metallic structure.

8. The supporting structure according to claim 1, wherein said first metallic structure is form-lockingly connected to said second metallic structure by between one and two bulges having at least one bottleneck, and said ceramic material is disposed between said first and second structures.

9. The supporting structure according to claim 8, wherein said at least one bottleneck is in the shape of at least one pushbutton.

10. The supporting structure according to claim 8, wherein said ceramic material is a thin metal oxide film.

11. The supporting structure according to claim 1, wherein said ceramic material is an oxidized surface of at least one of said first and second structures.

12. The supporting structure according to claim 11, wherein said oxidized surface is applied to a desired shape attained by said at least one supporting structure.

13. The supporting structure according to claim 1, wherein said ceramic material is a chemically treated surface of at least one of said first and second structures.

14. The supporting structure according to claim 13, wherein said chemically treated surface is applied to a desired shape attained by said supporting structure.

15. The supporting structure according to claim 1, wherein said ceramic material is a surface coating of at least one of said first and second structures.

16. The supporting structure according to claim 15, wherein said surface coating is applied to a desired shape attained by said supporting structure.

* * * * *